(12) United States Patent (10) Patent No.: US 8,841,938 B2
Wu (45) Date of Patent: Sep. 23, 2014

(54) VOLTAGE TO CURRENT CONVERTER

(71) Applicant: Hon Hai Precision Industry Co., Ltd., New Taipei (TW)

(72) Inventor: E-In Wu, Yunlin County (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/739,069

(22) Filed: Jan. 11, 2013

(65) Prior Publication Data

US 2014/0197866 A1 Jul. 17, 2014

(51) Int. Cl.
*H03F 3/45* (2006.01)
*H02M 11/00* (2006.01)

(52) U.S. Cl.
CPC .................................... *H02M 11/00* (2013.01)
USPC ......................................................... 327/103

(58) Field of Classification Search
USPC ......................................................... 327/103
See application file for complete search history.

(56) References Cited

U.S. PATENT DOCUMENTS

| | | | |
|---|---|---|---|
| 4,427,903 A | 1/1984 | Sugimoto | |
| 5,519,310 A | 5/1996 | Bartlett | |
| 5,525,897 A | 6/1996 | Smith | |
| 5,550,495 A | 8/1996 | Fotouhi | |
| 5,610,505 A | 3/1997 | Bernardson et al. | |
| 5,619,125 A | 4/1997 | Lakshmikumar | |
| 5,629,614 A | 5/1997 | Choe et al. | |
| 5,917,368 A | 6/1999 | Tan et al. | |
| 6,326,855 B1 | 12/2001 | Jelinek et al. | |
| 6,388,507 B1 * | 5/2002 | Hwang et al. | 327/538 |
| 2004/0232950 A1 | 11/2004 | Mallinson | |
| 2007/0229161 A1 | 10/2007 | Killat | |
| 2009/0079470 A1 | 3/2009 | Bi | |
| 2009/0273374 A1 | 11/2009 | Wang | |

* cited by examiner

*Primary Examiner* — Daniel Rojas
(74) *Attorney, Agent, or Firm* — Novak Druce Connolly Bove + Quigg LLP

(57) ABSTRACT

The invention provides a voltage to current converter that contains an diode-connected NMOS transistor, a diode-connected PMOS transistor, and a voltage-controlled signal input circuit. The source of the NMOS transistor and the drain of the PMOS transistor are connected together and connected to the voltage-controlled signal input circuit in series. The invention is implemented and tested in the integrated circuit. When an input voltage signal is inputted, a current of the PMOS transistor is substantially linearly proportional to the input voltage signal.

3 Claims, 13 Drawing Sheets

(a)

(a)

FIG. 3 (a)(b)
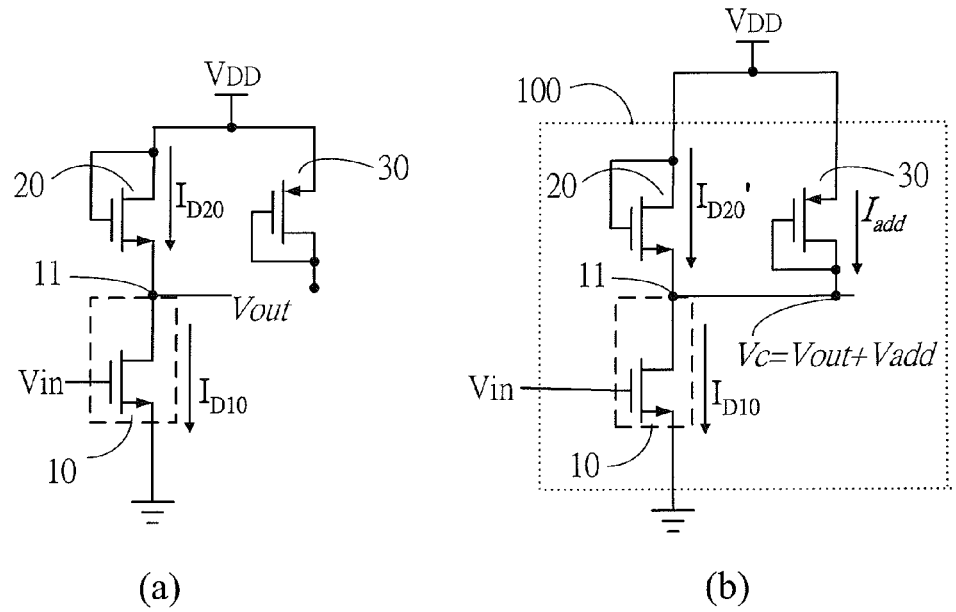
(a)          (b)
FIG. 4
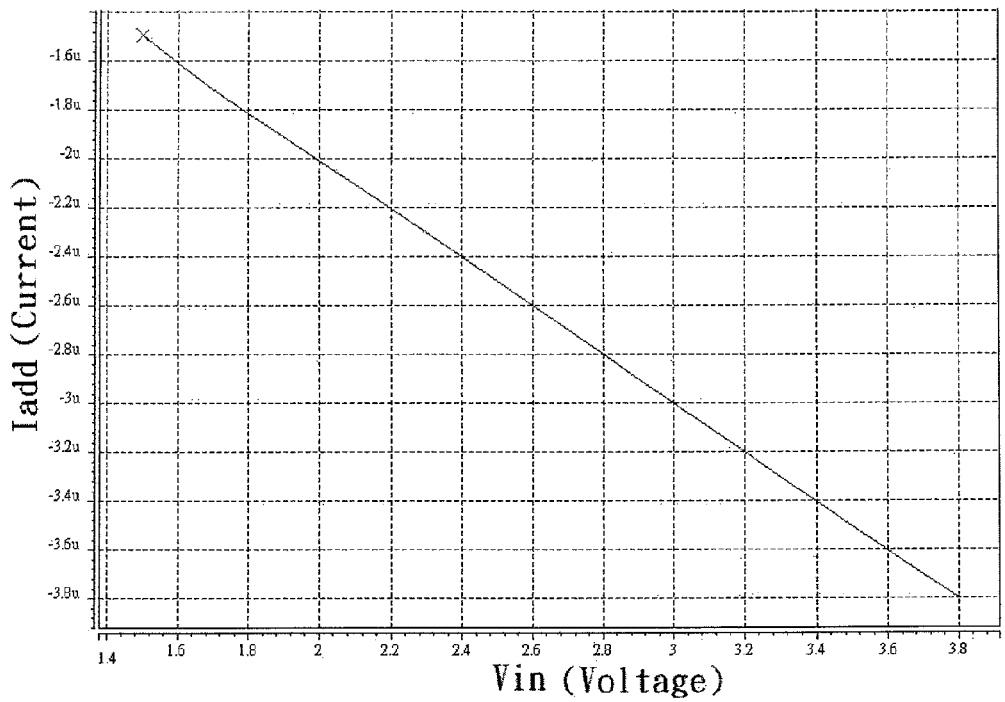

(a)

(b)

(c)

(d)

(a)

(b)

(a)

(b)

(a)

(b)

(a)

(b)

(c)

(d)

US 8,841,938 B2

VOLTAGE TO CURRENT CONVERTER

BACKGROUND OF THE INVENTION

1. Field of the Invention

The present invention relates to a voltage-controlled current source MOSFET transistor device without any resistors.

2. Description of the Prior Art

In electronic circuits, linearized voltage-to-current conversion circuits are widely used in many applications, such as analog-to digital converters, the voltage-controlled oscillator in a phase-locked loop, multipliers, dividers, and other applications where a current signal, rather than a voltage signal, is proper for signal transmission over long-distance circuits. A conventional voltage-to-current conversion circuit is shown in FIG. 1. The output current $I_{out}=V_{in}/Rs$ is generated from the current mirror. To decrease $I_{out}$, a large Rs is required. However, in the integrated circuits, large resistance requires a large area. Furthermore, the sheet resistance of poly resistors can be changed by the process variation.

SUMMARY OF THE INVENTION

The invention provides a voltage to current converter circuit. The circuit contains an NMOS transistor with a gate connected to a drain, a PMOS transistor with a gate connected to a drain, and a voltage-controlled signal input circuit. The source of the NMOS transistor and the drain of the PMOS transistor are connected together and coupled to the voltage-controlled signal input circuit in series. The invention is implemented and tested in the integrated circuit. When an input voltage signal ($V_{in}$) is inputted, a current of the PMOS transistor is substantially linearly proportional to the input voltage signal ($V_{in}$). The amount and linear range of the current of the PMOS transistor are changed by adjusting the size ratio of the NMOS transistor to the PMOS transistor. A common connected node of the NMOS transistor, the PMOS transistor, and the voltage-controlled signal input circuit outputs a voltage signal which is able to drive a common-source MOSFET transistor or a gate of an additional MOSFET transistor such that a current that flows through the common-source MOSFET transistor or the additional MOSFET transistor is substantially linearly proportional to the input voltage signal.

For better understanding of the present invention, a MOSFET transistor is used as the voltage-controlled signal input circuit, and the NMOS transistor is designed to be larger than the PMOS transistor.

The proportionality and linear range between the current of the PMOS transistor and the input voltage signal ($V_{in}$) are changed by adjusting the size ratios of the NMOS transistor, the PMOS transistor, and the MOSFET transistor of the voltage-controlled signal input circuit of the present invention.

The invention provides a voltage to current converter circuit, the advantages of which are that it has no resistors, a simple composition, and a small chip area.

BRIEF DESCRIPTION OF THE DRAWINGS

The above and other objectives, features, and advantages of the present invention are hereunder illustrated with specific embodiments in conjunction with the accompanying drawings and therefore rendered distinctive and comprehensible, in which:

FIGS. 3(a) and (b) illustrate the principle of a voltage to current converter circuit according to a specific embodiment of the present invention.

FIG. 4 shows the simulation results of the current characteristics of the PMOS transistor 30 of a voltage-current converter circuit according to the embodiment of the present invention illustrated in FIG. 3(b).

DETAILED DESCRIPTION OF THE EMBODIMENTS OF THE INVENTION

In the specification, the "size" of the MOSFET transistor of the present invention is the ratio of the weight to length of the MOSFET transistor, which is represented by "$(W/L)_{xx}$", and the index "$_{xx}$" is the component number of each MOSFET transistor in the figure. In the figures, an NMOS transistor with a gate connected to a drain is identified as 20; a PMOS transistor with a gate connected to a drain is identified as 30; a voltage-controlled signal input circuit is identified as 10.

Figure 1:
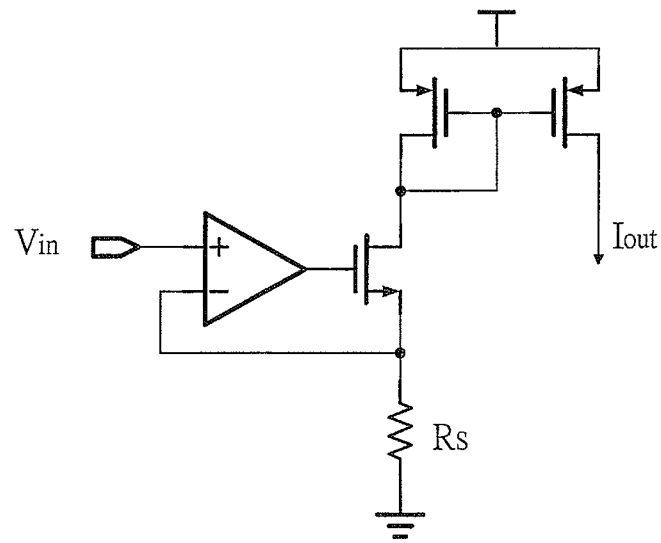
FIG. 1 shows a simplified schematic diagram of a conventional linear voltage to current converter.
Figure 2:
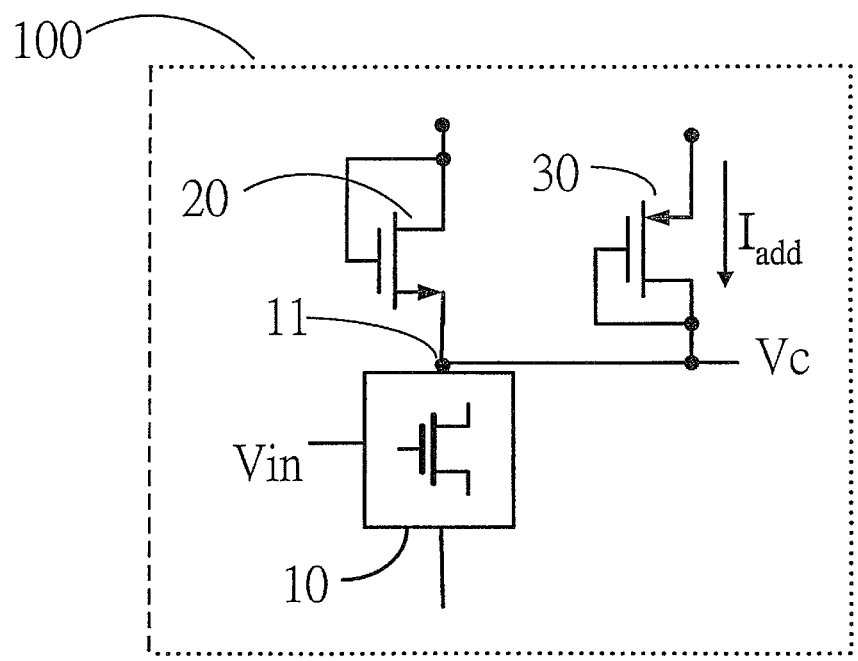
FIG. 2 shows a circuit diagram of a voltage-current converter circuit according to a specific embodiment of the present invention.

FIG. 2 shows a preferred embodiment of the voltage-current converter circuit of the present invention. In this embodiment, the voltage-current converter circuit 100 includes an NMOS transistor 20 with a gate connected to a drain, a PMOS transistor 30 with a gate connected to a drain, and a voltage-controlled signal input circuit 10. The voltage-controlled signal input circuit 10 includes at least one MOSFET transistor. The source of the NMOS transistor 20 and the drain of the PMOS transistor 30 are connected to a connection node 11 of the voltage-controlled signal input circuit 10. When an input voltage signal $V_{in}$ is inputted to the voltage-controlled signal input circuit 10, the PMOS transistor 30 generates a current that is substantially linearly proportional to the input voltage signal $V_{in}$. The voltage of the connection node 11 is able to make a current that flows through an additional p-channel MOSFET transistor. The current of the additional p-channel MOSFET transistor is a size ratio copy of the current of the PMOS transistor 30.

FIG. 3 (*a*) and (*b*) illustrate the relationship between the current $I_{add}$ that flows through the PMOS transistor 30 and the input voltage signal $V_{in}$. For better understanding of the present invention in mathematical analysis, an n-channel MOSFET transistor is used for the voltage-controlled signal input circuit 10. The NMOS transistor 20 and the PMOS transistor 30 are connected to a power source VDD. In FIG. 3 (*a*), the drain of the PMOS transistor 30 is not connected to the connection node 11. However, in FIG. 3 (*b*), the drain of the PMOS transistor 30 is connected to the connection node 11.

The components and the input voltage signal $V_{in}$ in FIG. 3 (*a*) and (*b*) are all the same. In the FIG. 3 (*a*), the current $I_{D10}$ is equal to the current $I_{D20}$, the voltage of the connection node 11 is assumed to be $V_{out}$. In FIG. 3 (*b*), because a small current $I_{add}$ that flows to the connection node 11 is added through the PMOS transistor 30, the current $I_{D10}$ is equal to $I_{D20}' + I_{add}$. The voltage of the connection node 11 is changed from $V_{out}$ to Vc because of the current $I_{add}$. The Vc of FIG. 3 (*b*) assumed that the $V_{out}$ of FIG. 3 (*a*) adds a voltage $V_{add}$ in the MOSFET saturation region.

By using the current equation of a MOSFET transistor in the saturation region, the voltage $V_{add}$ and the relationship between the current $I_{add}$ and the input voltage signal $V_{in}$ can be calculated.

FIG. 3 (*a*): $I_{D10} = I_{D20}$ (1)

FIG. 3 (*b*): $I_{D10} = I_{D20}' + I_{add}$ (2)

Combining Eq. (1) and Eq. (2) yields the following result:

$$I_{D10} = I_{D20} = I_{D20}' + I_{add} \quad (3)$$

Referring to FIG. 3 (*a*) and (*b*), the small current $I_{add}$ makes the voltage $V_{TH20}$ increase by a voltage of $\neq V_{TH20}$. Assume the current $I_{D20} = n \cdot I_{D20}'$, where $n>1$. By using $I_{D20}' = n \cdot I_{D20}'$ in the current equation of a MOSFET transistor in the saturation region, the formula can be calculated as follows:

$$I_{D20} = n^* I_{D20}' : \quad (4)$$

$$\frac{1}{2} \cdot k_n' \left(\frac{W}{L}\right)_{20} \cdot (V_{GS20} - V_{TH20})^2 =$$
$$n \cdot \frac{1}{2} \cdot k_n' \left(\frac{W}{L}\right)_{20} \cdot (V_{GS20} - V_{add} - V_{TH20} - \Delta V_{TH20})^2$$

where $k_n' = \mu_n C_{ox}$, $k_p' = \mu_p C_{ox}$ $$V_{GS20} - V_{TH20} = \sqrt{n} \cdot (V_{GS20} - V_{add} - V_{TH20} - \Delta V_{TH20})$$

By solving Eq. (4) for $V_{add}$:

$$V_{add} = (V_{GS20} - V_{TH20}) \cdot \left(1 - \frac{1}{\sqrt{n}}\right) - \Delta V_{TH20} \quad (5)$$

Referring to FIG. 3 (*b*), the current $I_{add}$ is also equal to a current that flows through the PMOS transistor 30. By using the current equation of a MOSFET transistor in the saturation region, the current $I_{add}$ is expressed as:

$$I_{add} = \frac{1}{2} \cdot k_p' \left(\frac{W}{L}\right)_{30} \cdot (V_{GS30} - V_{TH30})^2$$

In FIG. 3 (*b*), assume that the voltage between the gate of the NMOS transistor 20 and source of the NMOS transistor 20 is $V_{GS20}'$, and that a threshold voltage is $V_{TH20}'$, based on Eq. (3), $I_{D20} = I_{D20}' + I_{add} = n \cdot I_{D20}'$, $n>1$; by using the current equation of a MOSFET transistor in the saturation region, the factor "n" is expressed as:

$$n = \frac{I_{D20}' + I_{add}}{I_{D20}'} = \frac{\frac{1}{2} \cdot k_n' \left(\frac{W}{L}\right)_{20} \cdot (V_{GS20}' - V_{TH20}')^2 +}{\frac{1}{2} \cdot k_n' \left(\frac{W}{L}\right)_{20} \cdot (V_{GS20}' - V_{TH20}')^2} \quad (6)$$
$$\frac{\frac{1}{2} \cdot k_p' \left(\frac{W}{L}\right)_{30} \cdot (V_{GS30} - V_{TH30})^2}{}$$

$$\frac{1}{\sqrt{n}} = $$
$$\sqrt{\frac{k_n' \left(\frac{W}{L}\right)_{20} \cdot (V_{GS20}' - V_{TH20}')^2}{k_n' \left(\frac{W}{L}\right)_{20} \cdot (V_{GS20}' - V_{TH20}')^2 + k_p' \left(\frac{W}{L}\right)_{30} \cdot (V_{GS30} - V_{TH30})^2}}$$

Substituting Eq. (6) into Eq. (5), $V_{add}$ is expressed as follows:

$$V_{add} = \quad (7)$$
$$(V_{GS20} - V_{TH20}) \cdot \left(1 - \sqrt{\frac{k_n' \left(\frac{W}{L}\right)_{20} \cdot (V_{GS20}' - V_{TH20}')^2}{k_n' \left(\frac{W}{L}\right)_{20} \cdot (V_{GS20}' - V_{TH20}')^2 + k_p' \left(\frac{W}{L}\right)_{30} \cdot (V_{GS30} - V_{TH30})^2}}\right) - \Delta V_{TH20}$$

If the added current $I_{add}$ is very small, the variation $\Delta V_{TH20}'$ of the $V_{TH20}$ is very small. Therefore, the voltage $V_{GS20}$ is approximately $V_{GS20}'$ and the voltage $V_{TH20}$ is approximately $V_{TH20}'$. The second term of Eq. (7) is:

$$\left(1 - \sqrt{\frac{k_n' \left(\frac{W}{L}\right)_{20} \cdot (V_{GS20}' - V_{TH20}')^2}{k_n' \left(\frac{W}{L}\right)_{20} \cdot (V_{GS20}' - V_{TH20}')^2 + k_p' \left(\frac{W}{L}\right)_{30} \cdot (V_{GS30} - V_{TH30})^2}}\right),$$

which is similar to $$z = \left(1 - \sqrt{\frac{x}{x+y}}\right).$$

The "z" value is dependent on the "y". For example, if the "y" is very small, then the result of the "z" will be much smaller. However, the first term of Eq. (7) is: $(V_{GS20} - V_{TH20})$ the value of which is smaller than 5 if the VDD and $V_{in} \leq$ DC 5V. In Eq. (7), relative to the variation of the input voltage signal $V_{in}$, when the value of the $V_{add}$ is from 0.0105 to 0.012, it approaches a constant value if the $(W/L)_{30}$ is very small and the PMOS transistor 30 is operating in the saturation region. Therefore, the value of the $V_{add}$ depends on the component size $(W/L)_{30}$ of the PMOS transistor 30. The smaller the $(W/L)_{30}$ is, the smaller the $V_{add}$ is, and the influence of the variation of the input voltage signal $V_{in}$ on the $V_{add}$ is slight.

Since the $(W/L)_{30}$ is small, the current $I_{add}$ and the voltage $\Delta V_{TH20}'$ are small too. When the $\Delta V_{TH20}'$ is small enough to be ignored, the current equation of the MOSFET transistor in the saturation region can be used to calculate the current $I_{add}$, which is equal to the current $I_{D20}'$ (FIG. 3 (b)) subtracted from the current $I_{D20}$ (FIG. 3 (a)). The equations of the MOSFET transistor current $I_{D20}$ and $I_{D20}'$ in the saturation region are expressed as:

FIG. 3 (a): $I_{D20} = \frac{1}{2}k'_n \cdot \left(\frac{W}{L}\right)_{20} \cdot (V_{DD} - V_{out} - V_{TH20})^2$ FIG. 3 (b): $I'_{D20} = \frac{1}{2}k'_n \cdot \left(\frac{W}{L}\right)_{20} \cdot (V_{DD} - (V_{out} + V_{add}) - V_{TH20})^2$, $$I_{add} = I_{D20} - I'_{D20}$$

The equations of $I_{D20}$ and $I_{D20}'$ can be solved for obtaining $I_{add}$ as follows:

$$I_{add} = \frac{1}{2}k'_n \cdot \left(\frac{W}{L}\right)_{20} \cdot (V_{DD} - V_{out} - V_{TH20})^2 - \frac{1}{2}k'_n \cdot \left(\frac{W}{L}\right)_{20} \cdot (V_{DD} - (V_{out} + V_{add}) - V_{TH20})^2 \quad (8)$$

$$\frac{1}{2}k'_n \cdot \left(\frac{W}{L}\right)_{20} \cdot [(V_{DD} - V_{out} - V_{TH20})^2 - (V_{DD} - V_{out} - V_{add} - V_{TH20})^2]$$

$$\frac{1}{2}k'_n \cdot \left(\frac{W}{L}\right)_{20} \cdot [-V_{add}(V_{add} - 2(V_{DD} - V_{out} - V_{TH20}))]$$

$$\frac{1}{2}k'_n \cdot \left(\frac{W}{L}\right)_{20} \cdot [-V_{add}^2 + 2 \cdot V_{add}(V_{DD} - V_{out} - V_{TH20})]$$

To calculate the relationship between the voltage $V_{out}$ of the connection node 11 and the input voltage signal $V_{in}$ in FIG. 3 (a), the equation of the MOSFET transistor current in the saturation region is used. Since $I_{D10}=I_{D20}$, the formula can be calculated as follows:

$$\frac{1}{2}k'_n\left(\frac{W}{L}\right)_{10} \cdot (V_{in} - V_{TH10})^2 = \quad (9)$$

$$\frac{1}{2}k'_n\left(\frac{W}{L}\right)_{20} \cdot (V_{DD} - V_{out} - V_{TH20})^2 \sqrt{\left(\frac{W}{L}\right)_{10}} \cdot (V_{in} - V_{TH10}) =$$

$$\sqrt{\left(\frac{W}{L}\right)_{20}} \cdot (V_{DD} - V_{out} - V_{TH20})$$

$$V_{out} = V_{DD} - \left(\frac{\sqrt{\left(\frac{W}{L}\right)_{10}}}{\sqrt{\left(\frac{W}{L}\right)_{20}}}\right) \cdot (V_{in} - V_{TH10}) - V_{TH20} \quad (10)$$

By substituting Eq. (10) into Eq. (8), $I_{add}$ can be expressed as:

$$I_{add} = \frac{1}{2}k'_n \cdot \left(\frac{W}{L}\right)_{20} \cdot [-V_{add}^2 + 2 \cdot V_{add}(V_{DD} - V_{out} - V_{TH20})] \quad (11)$$

$$\frac{1}{2}k'_n \cdot \left(\frac{W}{L}\right)_{20} \cdot \left[2 \cdot V_{add} \cdot \left(\frac{\sqrt{\left(\frac{W}{L}\right)_{10}}}{\sqrt{\left(\frac{W}{L}\right)_{20}}}\right) \cdot (V_{in} - V_{TH10}) - V_{add}^2\right]$$

$$\frac{1}{2}k'_n \cdot \left[V_{add} \cdot \left(\sqrt{\left(\frac{W}{L}\right)_{10} \cdot \left(\frac{W}{L}\right)_{20}}\right) \cdot (V_{in} - V_{TH10}) - \frac{1}{2} \cdot \left(\frac{W}{L}\right)_{20} \cdot V_{add}^2\right]$$

In Eq. (7), relative to the variation of the input voltage signal $V_{in}$, when the value of the $V_{add}$ is approximately from 0.0105 to 0.012, it approaches a constant value if the $(W/L)_{30}$ is very small and the PMOS transistor 30 is operating in the saturation region. The $V_{add}$ has a very small effect on Eq. (11). Eq. (11) shows that the current $I_{add}$ that flows through the PMOS transistor 30 is a substantially linear function of the input voltage signal $V_{in}$.

To change the ratio of the current $I_{add}$ the input voltage signal $V_{in}$ to be larger than, equal to, or smaller than 1, the ratios of sizes between the MOSFET transistor 10, the NMOS transistor 20, and the PMOS transistor 30 are adjusted.

Referring to FIG. 4, to make the slope of the current $I_{add}$ and the input voltage signal $V_{in}$ substantially the same, the sizes of the MOSFET transistor 10, the NMOS transistor 20, the PMOS transistor 30 are adjusted. When VDD is DC 5V and the input voltage signal $V_{in}$ is from 1.5V to 3.8V, the simulation results of HSPICE show that the slope of the current $I_{add}$ which ranges from −1.5 uA to −3.8 uA, approaches that of the input voltage signal $V_{in}$, which ranges from 1.5V to 3.8V. The best linear region of the invented voltage to current conversion invention can be adjusted by changing (W/L) of the MOSFET transistors.

Figure 5:
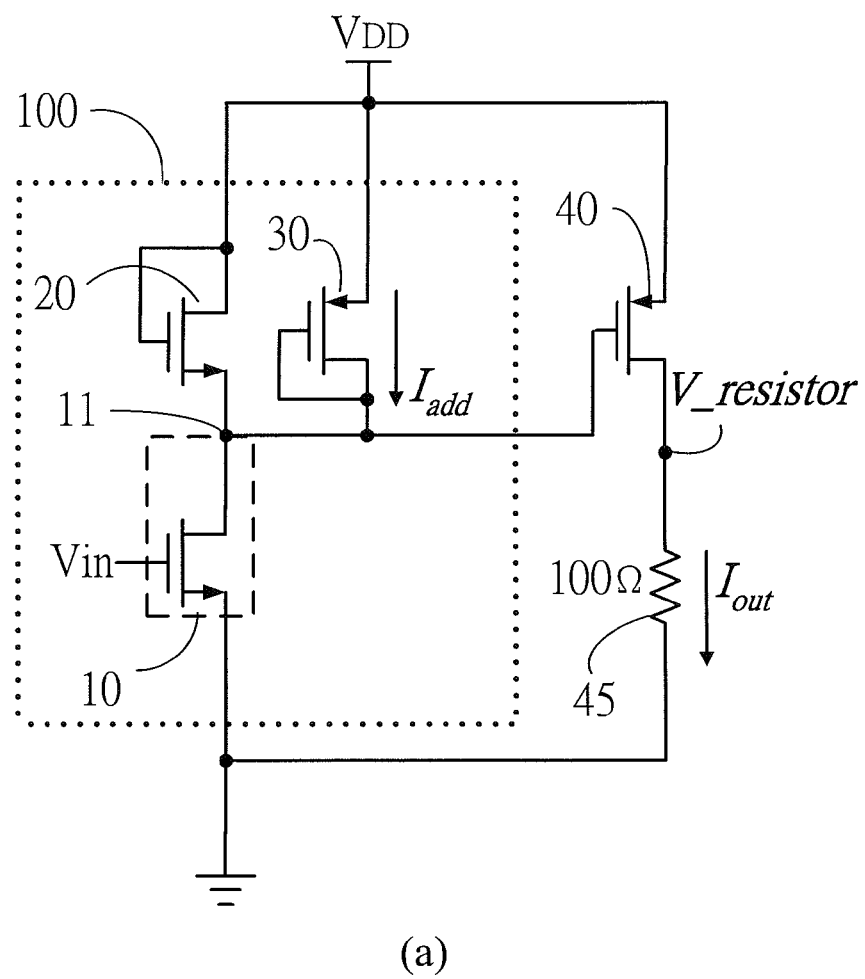
FIGS. 5 (a)-(d) show a circuit diagram and graphs illustrating the simulation and measurement results of the output current characteristics of an additional p-channel MOSFET transistor of a voltage to current converter circuit according to another embodiment of the present invention.
Figure 5:
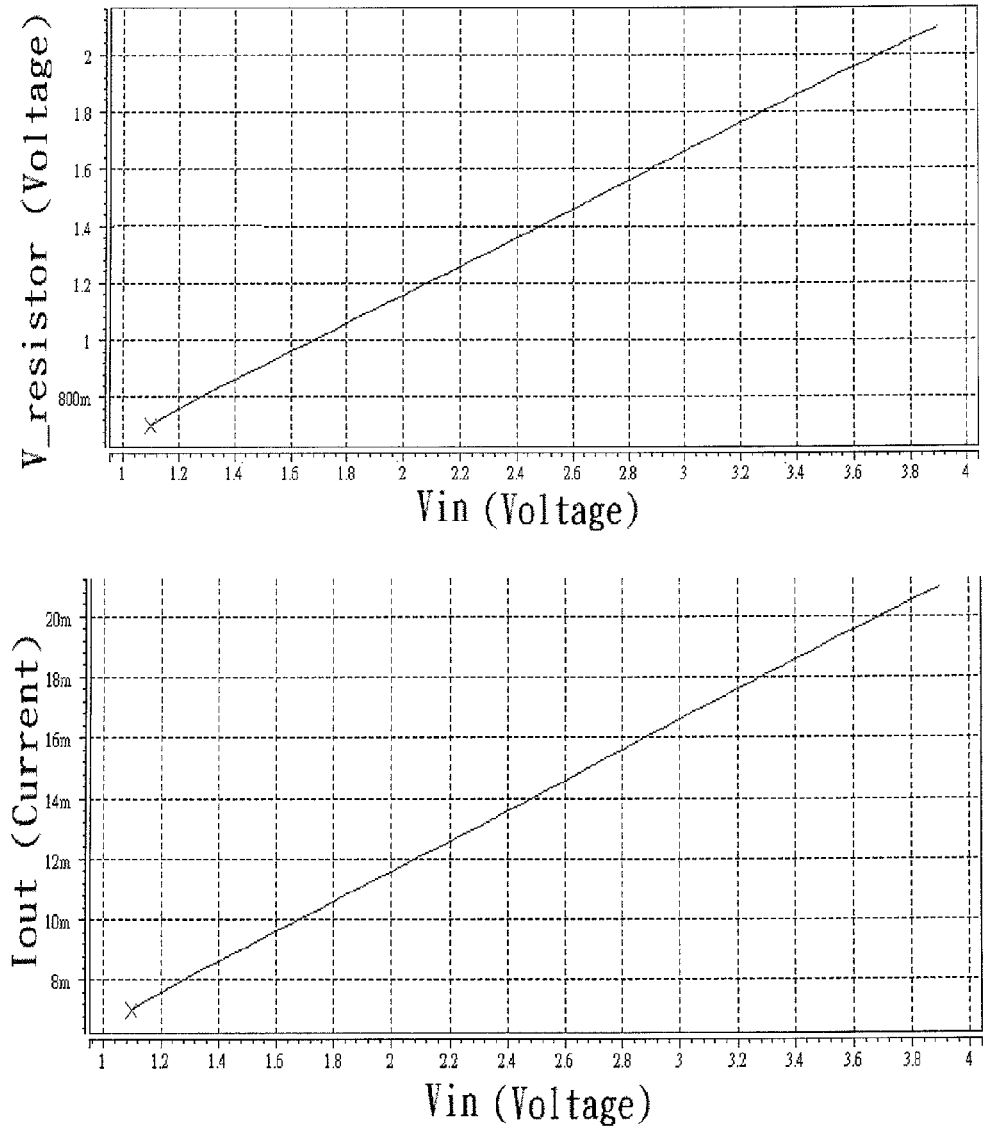
Figure 5:
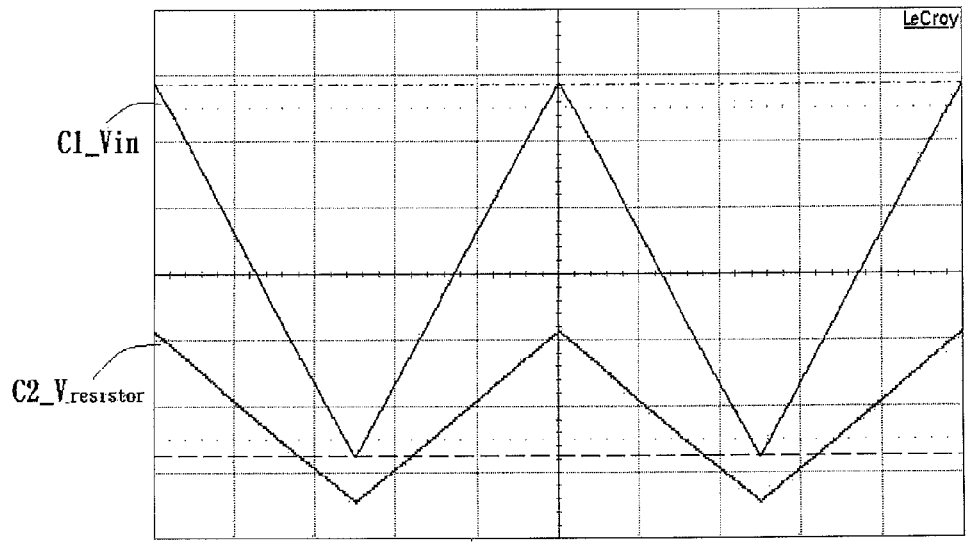
Figure 5:
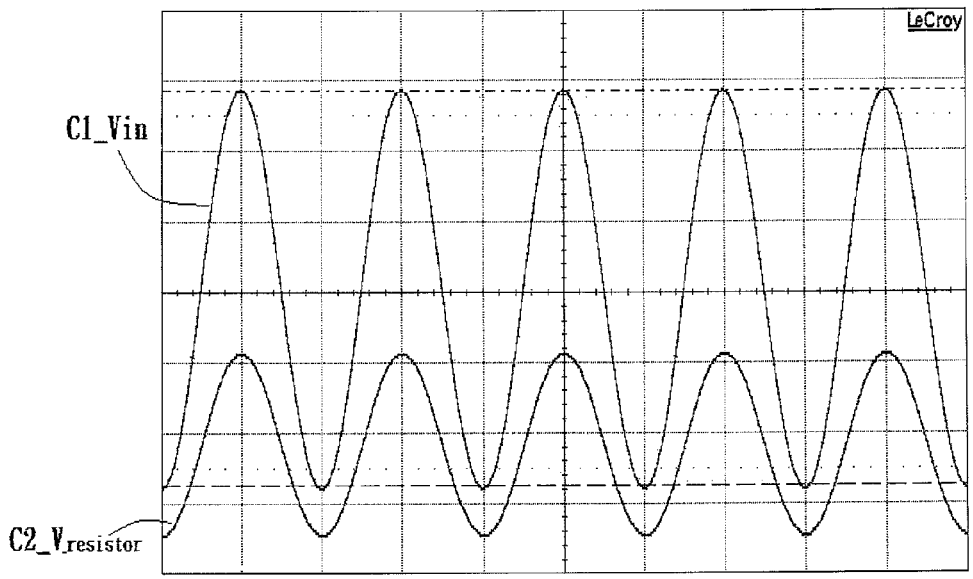

FIG. 5(a) is a circuit embodiment of the present invention that does not need any resistors; for simulation and testing of the present invention circuit, the connection node 11 is connected to a gate of an additional p-channel MOSFET transistor 40, which is a common source stage. For calculating an output current ($I_{out}$) of the additional p-channel MOSFET transistor 40 which flows through a 100Ω additional resistor 45 to produce a voltage in the embodiment, the equation I=V/R is adopted.

FIG. 5(b) is the HSPICE simulation results of the circuit embodiment in FIG. 5(a), where VDD=5V and $V_{in}$ is 1.1V~3.9V. The simulation results show that the current $I_{out}$=7 mA~21 mA and the voltage crossing the 100Ω resistor 45 is from 0.7V to 2.1V.

FIG. 5(c) shows the measured results of the integrated circuit of the circuit embodiment (FIG. 5(a)), where the power source is DC 5V and the $V_{in}$ is a 100 kHz sawtooth signal (C1_$V_{in}$) ranging from 1.1V to 3.9V. The measured results show that the voltage (C2_$V_{resistor}$) crossing the 100Ω resistor 45 is from 0.75V to 2.05V and the current $I_{out}$=7.5 mA~20.5 mA (I=V/R), which is approximate with the HSPICE simulation results (FIG. 5(b)).

FIG. 5(d) shows the measured results of the integrated circuit of the circuit embodiment (FIG. 5(a)), where the power source is DC 5V, $V_{in}$ is a 1 MHz sin wave signal (C1_$V_{in}$) ranging from 1.1V to 3.9V, and the voltage (C2_$V_{resistor}$) is crossing the 100Ω resistor 45.

Figure 6:
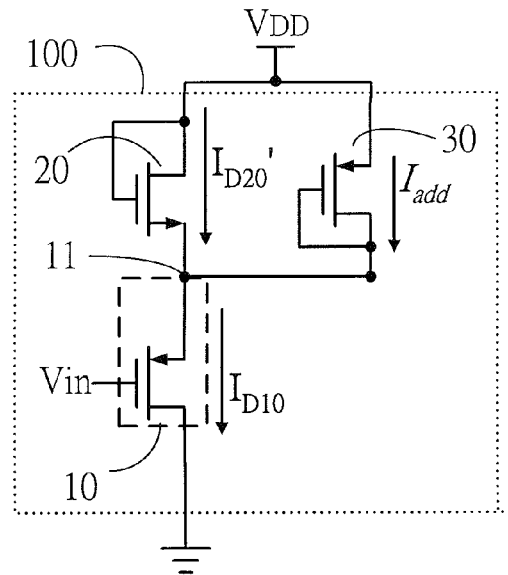
FIG. 6 (a) and (b) show a circuit diagram and graphs illustrating the simulation results of the current characteristics of the PMOS transistor 30 with a p-channel MOSFET transistor input voltage-controlled signal circuit of a voltage to current converter circuit according to another embodiment of the present invention.
Figure 6B:
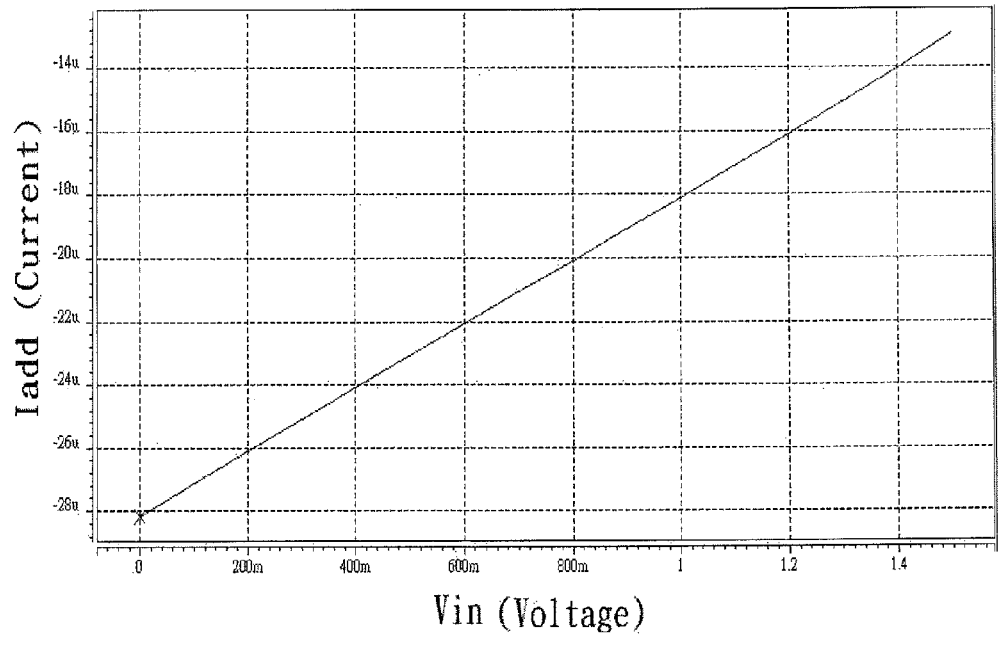

FIG. 6(a) shows another embodiment of the present invention. The voltage-controlled signal input circuit 10 is a p-channel MOSFET transistor. The circuit embodiment is simulated by HSPICE, where VDD=5V and $V_{in}$=0V~1.4V. The simulation results (FIG. 6(b)) show that the current $I_{add}$=−28 uA~−14 uA, which is inverse proportional to $V_{in}$.

Figure 7A:
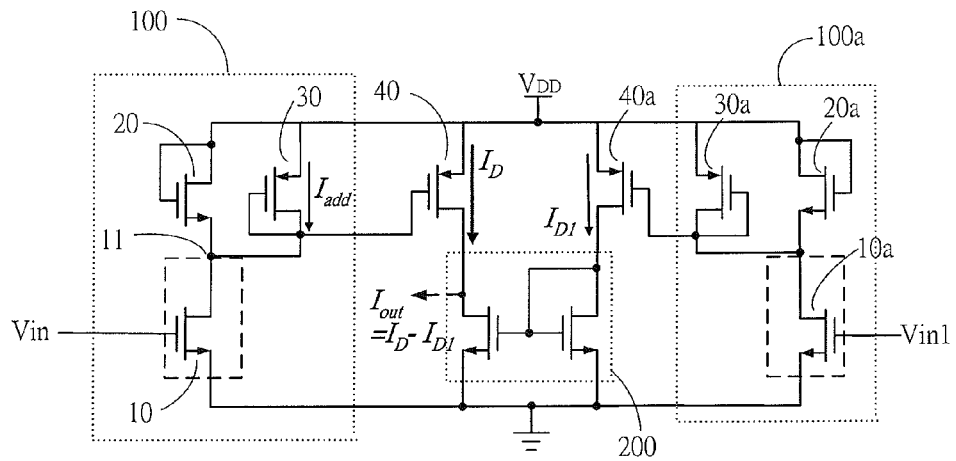
FIG. 7 (a) and (b) show a circuit diagram and graphs illustrating the simulation results of the output current characteristics of the additional p-channel MOSFET transistors with an output current-subtracted adjustment circuit of a voltage to current converter circuit according to one embodiment of the present invention.

FIG. 7(a) shows an embodiment of the present invention that adjusts the output current of the additional p-channel MOSFET transistors by subtraction. An n-channel MOSFET transistor is used as the voltage-controlled signal input circuit 10. Two invented voltage to current converter circuits 100 and 100a are placed in parallel and connected to a current mirror. The output current $I_{out}$ is equal to the current $I_{D1}$ generated by the input voltage signal $V_{in}1$ subtracted from the current $I_D$ generated by the input voltage signal $V_{in}$. By Eq. (11):

$$I_D = k'_n \cdot \left[ V_{add1} \cdot \left( \sqrt{\left(\frac{W}{L}\right)_{10} \cdot \left(\frac{W}{L}\right)_{20}} \right) \cdot (V_{in} - V_{TH10}) - \frac{1}{2} \cdot \left(\frac{W}{L}\right)_{20} \cdot V_{add1}^2 \right] \quad (12)$$

$$I_{D1} = k'_n \cdot \left[ V_{add2} \cdot \left( \sqrt{\left(\frac{W}{L}\right)_{10a} \cdot \left(\frac{W}{L}\right)_{20a}} \right) \cdot (V_{in1} - V_{TH10a}) - \frac{1}{2} \cdot \left(\frac{W}{L}\right)_{20a} \cdot V_{add2}^2 \right] \quad (13)$$

When the size of the MOSFET transistors in the two invented voltage to current converter circuits are the same, i.e., the sizes of the n-channel MOSFET transistor 10 and the n-channel MOSFET transistor 10a are the same, the sizes of the NMOS transistor 20 and NMOS transistor 20a are the same, the sizes of the PMOS transistor 30 and PMOS transistor 30a are the same, and the sizes of the additional p-channel MOSFET transistor 40 and the additional p-channel MOSFET transistor 40a are the same. By substituting $(W/L)_{10}=(W/L)_{10a}$, $(W/L)_{20}=(W/L)_{20a}$, $V_{TH10}=V_{TH10a}$ into Eq. (13), the $V_{add1}$ approaches $V_{add2}$. $I_{out}$, which is equal to $I_D-I_{D1}$ in FIG. 7(a). The $I_{out}$ can be obtained by subtracting Eq. (13) from Eq. (12).

$$I_{out} = k'_n \cdot V_{add1} \cdot \left( \sqrt{\left(\frac{W}{L}\right)_{10} \cdot \left(\frac{W}{L}\right)_{20}} \right) \cdot (V_{in} - V_{in1}) \quad (14)$$

Figure 7B:
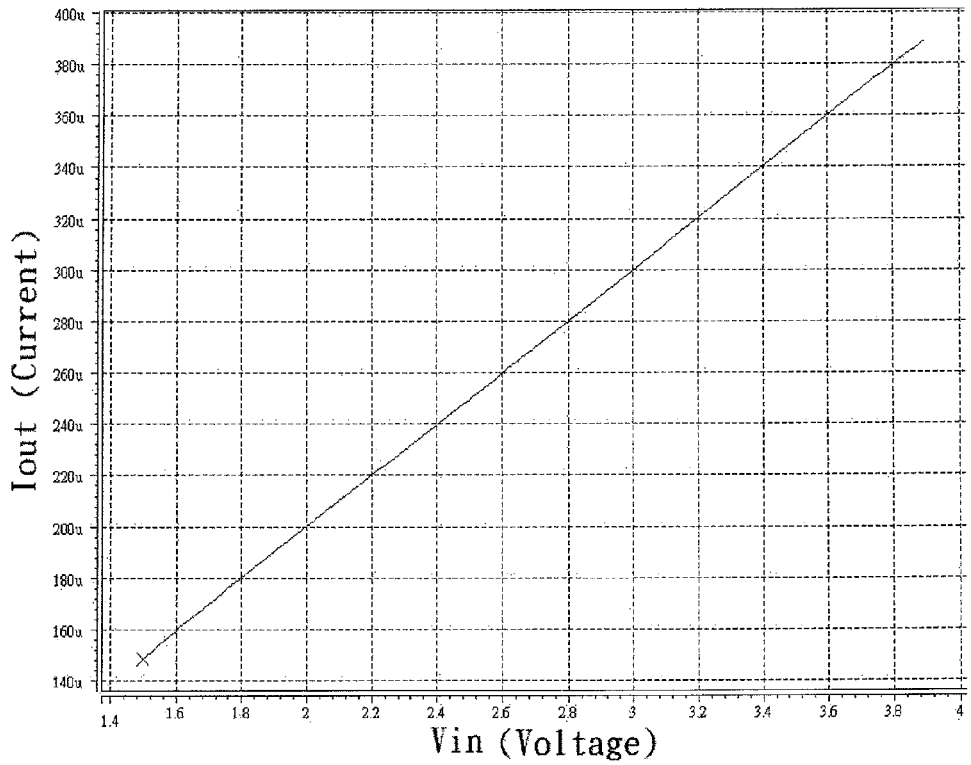

FIG. 7(b) shows the simulation results of the circuit embodiment (FIG. 7(a)) by HSPICE, where VDD=5V, $V_{in}$=1.5~3.9V, and $V_{in}1$=1V.

Figure 8A:
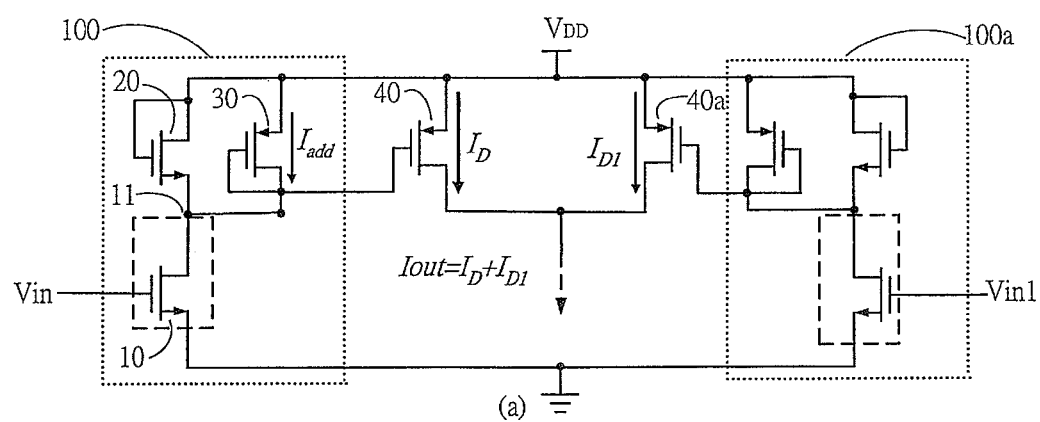
FIG. 8 (a) and (b) show the output current characteristics of additional p-channel MOSFET transistors with an added adjustment circuit of a voltage to current converter circuit according to one embodiment of the present invention.
Figure 8B:
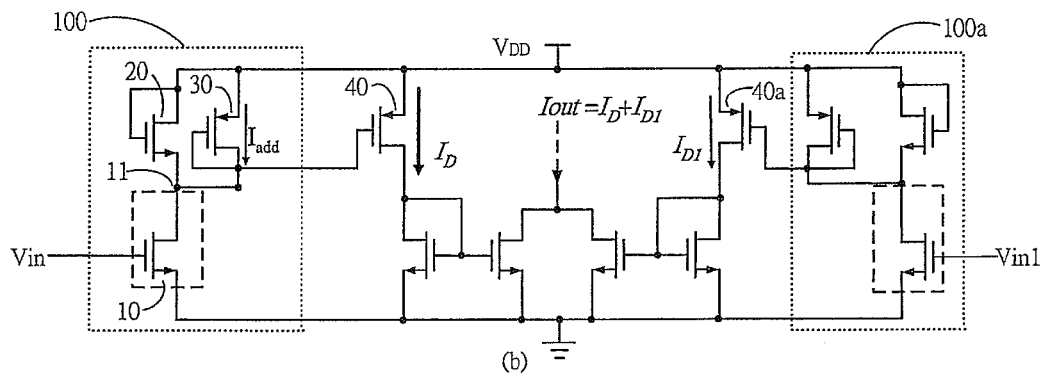

FIG. 8 (a) and (b) show two embodiments of the present invention that adjust the output current of the additional p-channel MOSFET transistors 40, 40a by addition. Two invented voltage to current converter circuits 100 and 100a are connected in parallel. When all the MOSFET transistors are operated in the saturation region, the output current $I_{out}$ is the sum of the current $I_D$ generated by the input voltage signal $V_{in}$ and the current $I_{D1}$ generated by the input voltage signal $V_{in}1$.

When the source of the NMOS transistor 20 and the drain of the PMOS transistor 30 of the present invention are connected to a lower voltage or the ground, the drain of the NMOS transistor 20 and the source of the PMOS transistor 30 are connected to the voltage-controlled signal ($V_{in}$) input circuit 10 in series. The current that flows through the NMOS transistor 20 is substantially inverse linearly proportional to the voltage-controlled signal ($V_{in}$) when the voltage-controlled signal ($V_{in}$) input circuit 10 is a p-channel MOSFET transistor.

Figure 9A:
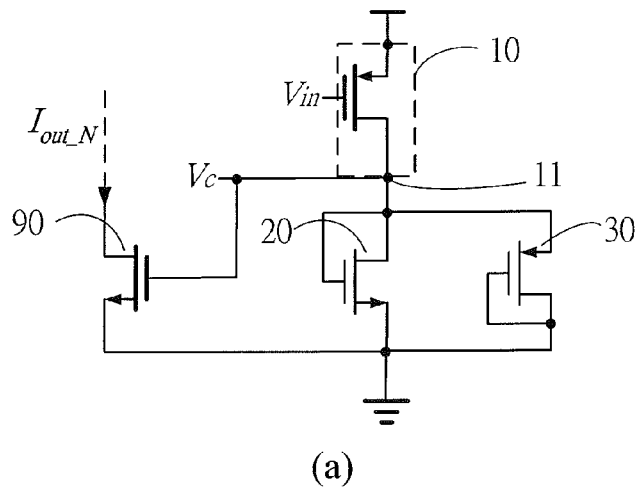
FIG. 9 (a) and (b) show a circuit diagram and graph illustrating the simulation results of the output current characteristics of an additional n-channel MOSFET transistor of a voltage to current converter circuit according to one embodiment of the present invention.

FIG. 9(a) shows another embodiment of the present invention. The drain of the NMOS transistor 20 and the source of the PMOS transistor 30 are connected to the connection node 11 of the voltage-controlled signal input circuit 10. A p-channel MOSFET transistor is adopted in the voltage-controlled signal input circuit 10, and the drain of the p-channel MOSFET transistor is the connection node 11. When the voltage signal $V_{in}$ is inputted to the voltage-controlled signal input circuit 10, the voltage of the connection node 11 can make the current $I_{out\_N}$ of the additional n-channel MOSFET transistor 90 in the saturation region substantially inverse linearly proportional to the voltage ($V_{in}$).

Figure 9B:
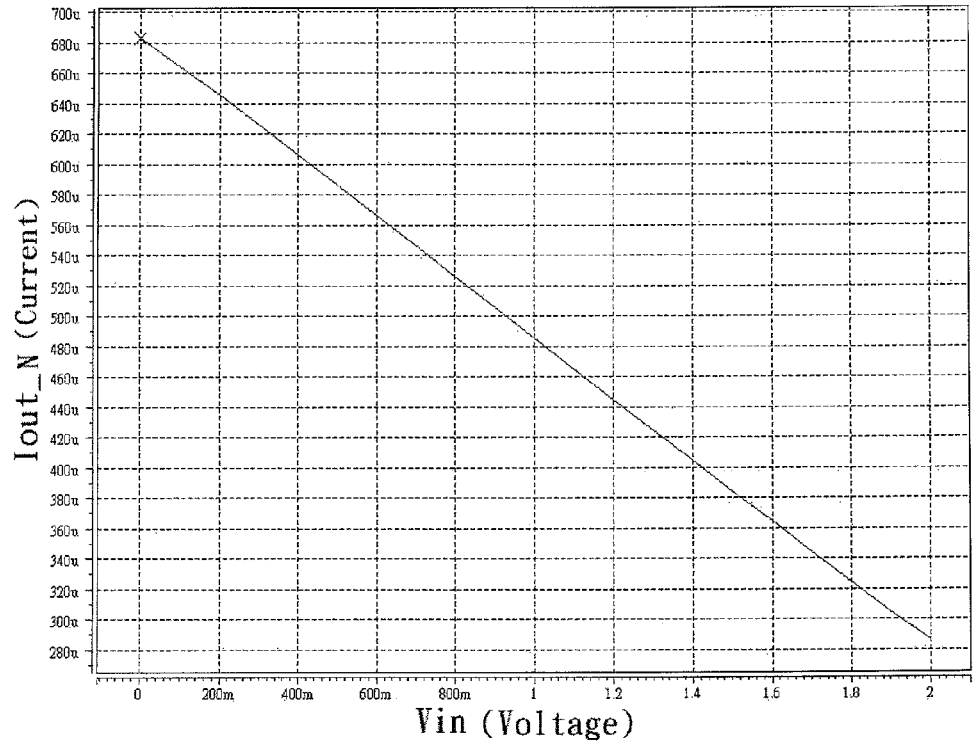

FIG. 9(b) presents HSPICE simulation results of the output current $I_{out\_N}$ of the additional n-channel MOSFET transistor 90 in FIG. 9(a), where the power source is DC 5V.

FIG. 10(a)-(d) show other embodiments of the present invention. The drain of the NMOS transistor 20 and the source of the PMOS transistor 30 are connected to different voltage potentials. An n-channel MOSFET transistor is adopted in the voltage-controlled signal input circuit 10. When the voltage signal $V_{in}$ is inputted to the voltage-controlled signal input circuit 10, the current $I_{add}$ that flows through the PMOS transistor 30 is substantially linearly proportional to the voltage signal ($V_{in}$).

Figure 10A:
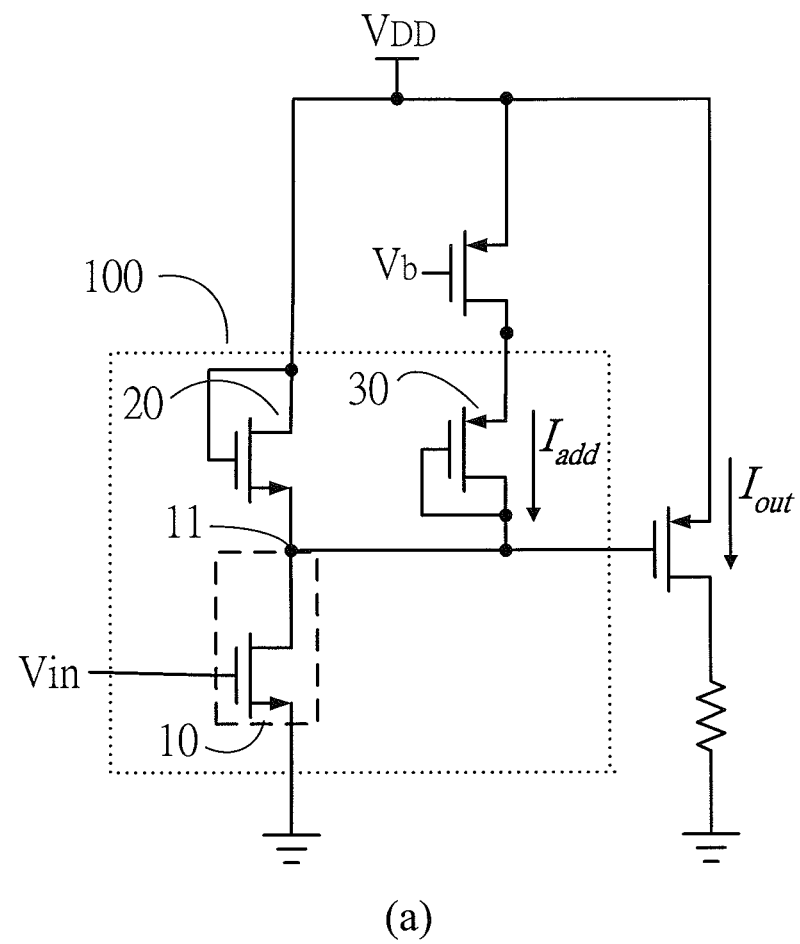
FIG. 10 (a)-(d) show two circuit diagrams and graphs illustrating the simulation results of the current characteristics of the PMOS transistor 30 and the additional p-channel MOSFET transistor of a voltage to current converter circuit according to other embodiments of the present invention.
Figure 10B:
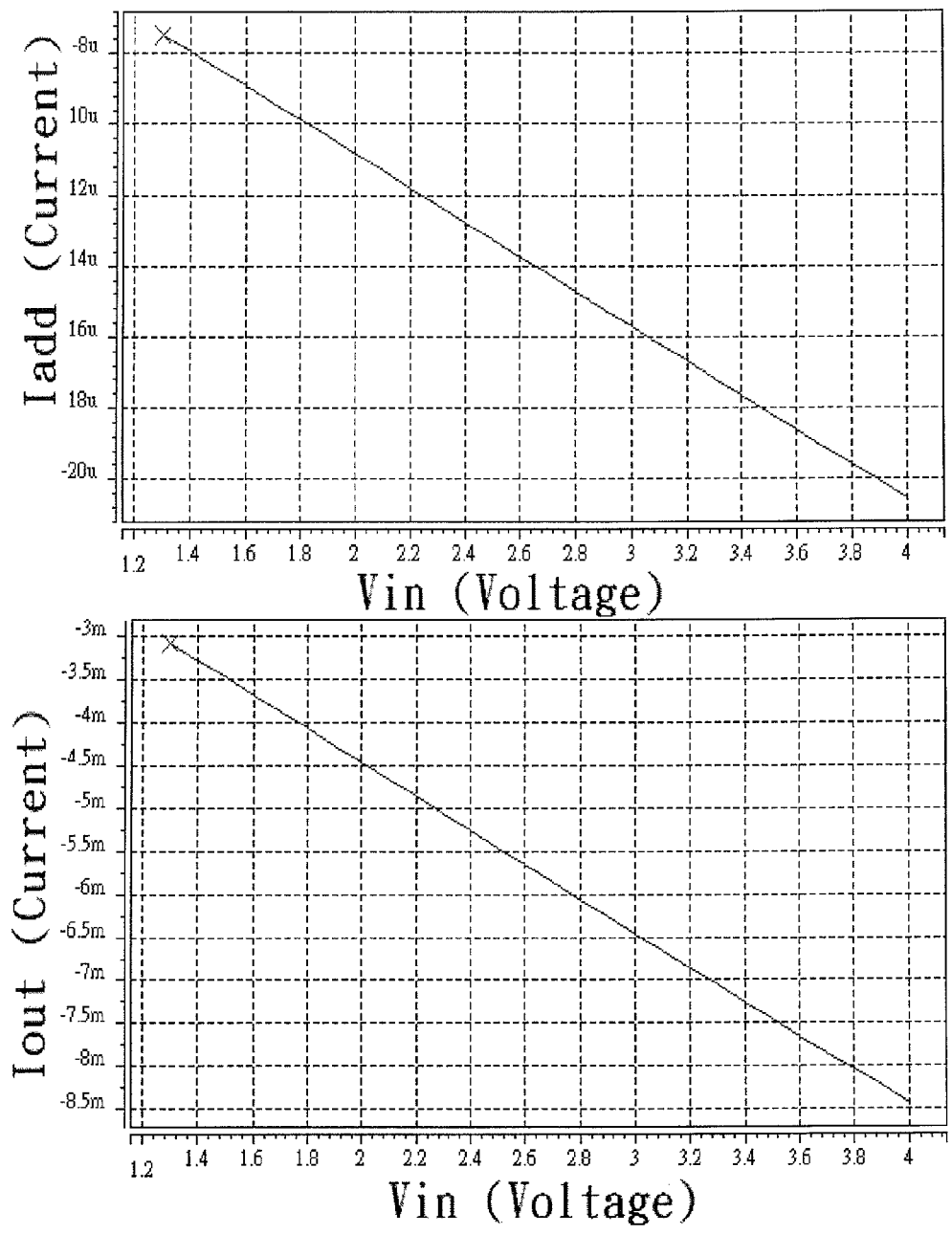
Figure 10C:
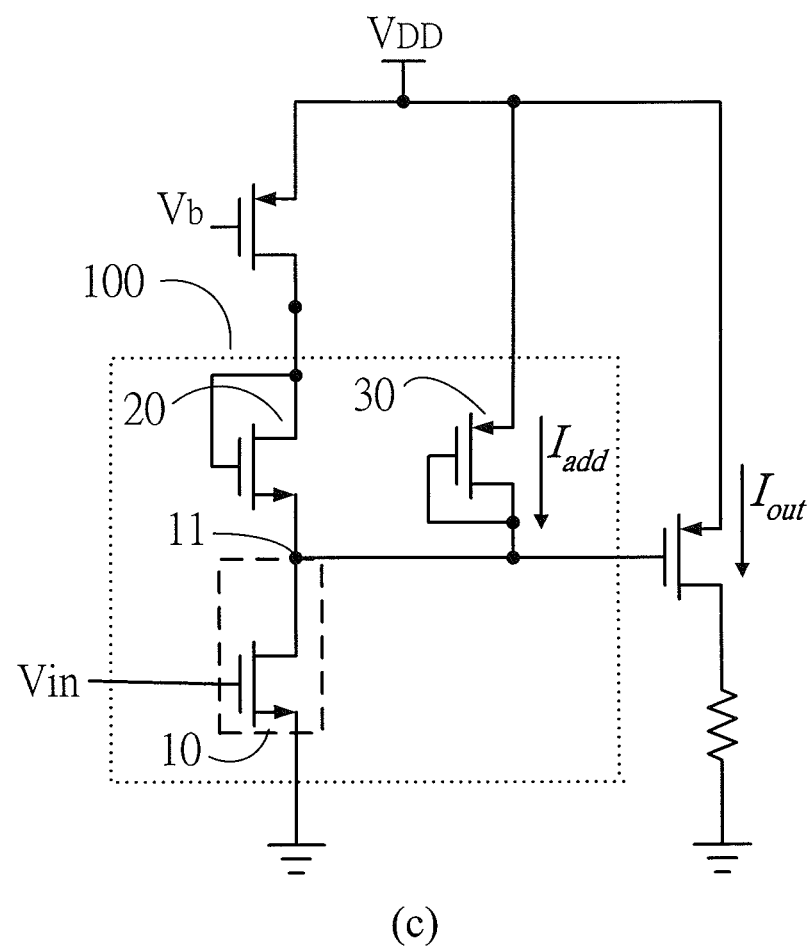
Figure 10D:
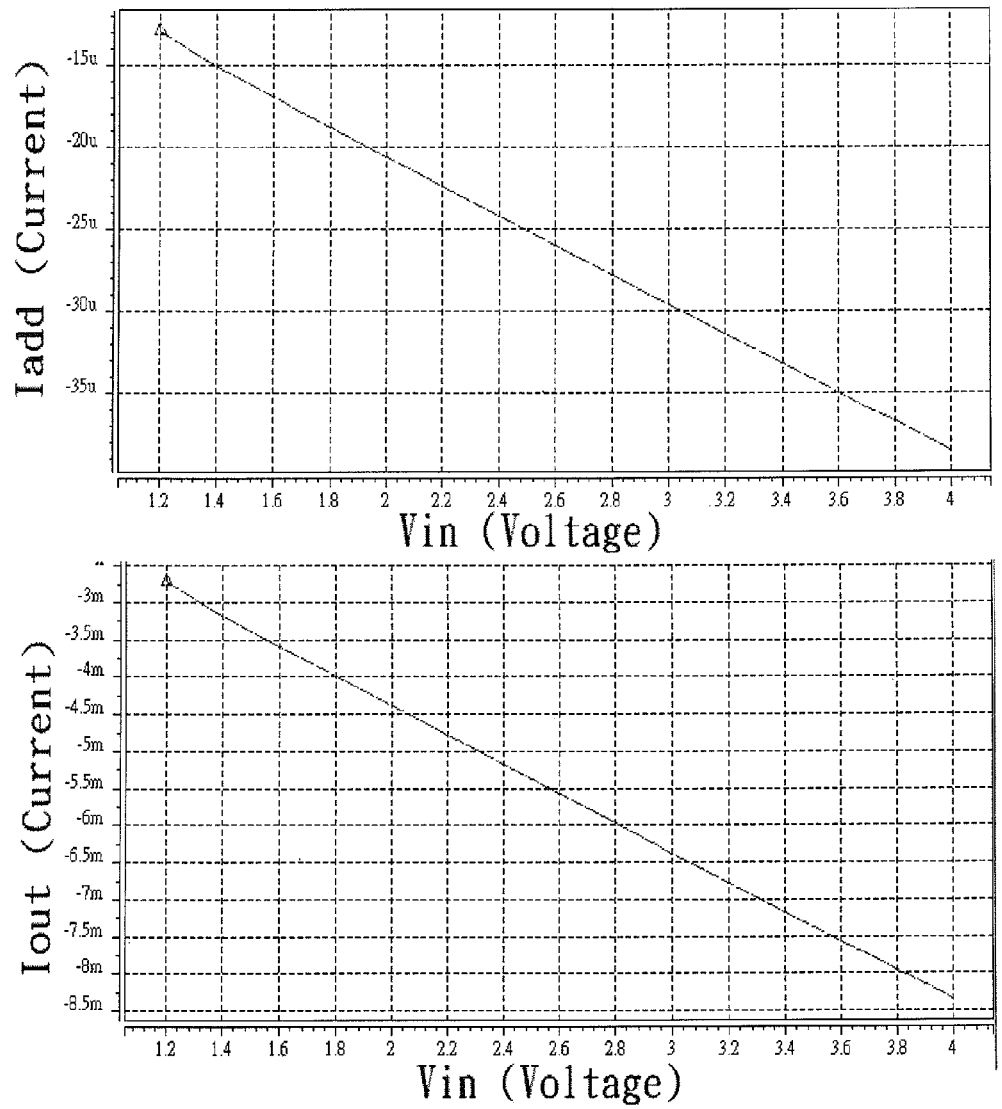

FIG. 10(b) is HSPICE simulation results of the current $I_{add}$ of the PMOS transistor 30 and the output current $I_{out}$ of the additional p-channel MOSFET transistor with the input voltage signal $V_{in}$ in the circuit FIG. 10(a), and FIG. 10(d) is HSPICE simulation results of the circuit FIG. 10(c), where the power source is DC 5V and the biasing voltage Vb is 2.5V.

As described in detail above, according to the results of the HSPICE simulation, real integrated circuit measurement, and the MOSFET transistor's current equation calculations, the present invention provides a voltage-current converter circuit that is simple in composition, has no resistors, and outputs substantially linearly proportional output current to the input voltage signal, reducing the process variation and cost.

It will be appreciated by those skilled in the art, however, that the present invention can be embodied in other specific forms without departing from the spirit or essential character thereof. The invention has been described in detail herein with reference to the accompanying drawings; it is to be understood that the present invention is not limited to that embodiment. The scope of the present invention is indicated by the appended claims rather than the foregoing, and all changes which come within the meaning and range of equivalents thereof are intended to be included therein.

What is claimed is:

1. A voltage-current converter circuit, comprising:
   an NMOS transistor, comprising a source, a drain, and a gate, wherein the gate of the NMOS transistor is connected to the drain of the NMOS transistor;
   a PMOS transistor, comprising a source, a drain, and a gate, wherein the gate of the PMOS transistor is connected to the drain of the PMOS transistor, and the drain of the PMOS transistor is connected to the source of the NMOS transistor; and
   a voltage-controlled signal input circuit, comprising a voltage-controlled signal input terminal and a connection node, wherein the connection node is connected to the source of the NMOS transistor and the drain of the PMOS transistor; when the voltage-controlled signal input circuit receives an input voltage signal, a current of the PMOS transistor is substantially linearly proportional to the input voltage signal, and both the voltages of the drain of the NMOS transistor and the source of the PMOS transistor are higher than the voltage of the connection node of the voltage-controlled signal input circuit.

2. The voltage-current converter circuit as claimed in claim 1, wherein the voltage-controlled signal input circuit comprises a MOSFET transistor.

3. The voltage-current converter circuit as claimed in claim 1, wherein the drain of the NMOS transistor and the source of the PMOS transistor are connected to equivalent potential voltages.

\* \* \* \* \*